United States Patent [19]  [11] 4,113,834
Show et al.  [45] Sep. 12, 1978

[54] PROCESS FOR CONVERTING WASTE DEAD-BURNED MAGNESIUM OXIDE-CONTAINING MATERIAL INTO USEFUL PRODUCT

[76] Inventors: Roger Show, 2206 Aldo Blvd., 62301; Robert Webb, both of Quincy, Ill.

[21] Appl. No.: 764,551

[22] Filed: Feb. 1, 1977

[51] Int. Cl.$^2$ .............................................. C01F 5/02
[52] U.S. Cl. ................................... 423/155; 423/635; 423/636
[58] Field of Search ....................... 423/636, 635, 155; 106/58

[56] References Cited

U.S. PATENT DOCUMENTS

| | | | |
|---|---|---|---|
| 3,287,144 | 11/1966 | Hodl et al. | 106/58 |
| 3,378,615 | 4/1968 | Zisner | 423/636 |
| 3,436,237 | 4/1969 | Crookston et al. | 106/58 |
| 3,677,779 | 7/1972 | Hughey | 106/58 |
| 3,689,218 | 9/1972 | Hodges | 423/636 |

FOREIGN PATENT DOCUMENTS 861,931  3/1961  United Kingdom ..................... 423/155

Primary Examiner—O. R. Vertiz
Assistant Examiner—Wayne A. Langel
Attorney, Agent, or Firm—Burns, Doane, Swecker & Mathis

[57] ABSTRACT

A process for the production of magnesium oxide of moderate activity and high availability from a waste material containing dead-burned magnesium oxide of essentially no activity and lower availability (e.g., spent basic oxygen furnace firebrick) is disclosed. Spent basic oxygen furnace firebrick particles are calcined at a temperature of about 1000° to about 2000° F. for a time of from about 15 to about 60 minutes. The magnesium oxide in the spent, calcined firebrick is thus converted from dead-burned magnesium oxide to a magnesium oxide having a solubility of above about 90% in dilute hydrochloric acid and moderate activity in the nature of light-burned magnesium oxide. The color of the calcined magnesium oxide is also improved and the carbon content of the spent firebrick is essentially removed. The resulting product is generally useful in the same manner as conventional light-burned magnesium oxide.

8 Claims, No Drawings

PROCESS FOR CONVERTING WASTE DEAD-BURNED MAGNESIUM OXIDE-CONTAINING MATERIAL INTO USEFUL PRODUCT

BACKGROUND OF THE INVENTION

The production of sufficient quantities of magnesium oxide to meet the ever-growing commerical demands has been hindered by a world-wide shortage of magnesium sources. Even in instances where magnesium sources are available for processing, the competition for available calcining facilities necessary in the production of various grades of magnesium oxide (magnesia), for example, light-burned magnesia and dead-burned magnesia, is severe.

The particular grade of magnesium oxide is essentially a function of the manner in which the magnesium oxide is produced. Generally, magnesium oxide is produced by the thermal decomposition of various magnesium compounds such as the magnesium salts of volatile acids. Commercial grades of magnesium oxide are generally prepared by the thermal decomposition of magnesite ($MgCO_3$), magnesium hydroxide or basic magnesium carbonate. The hydroxide and carbonate can be decomposed to the oxide at relatively low temperature (e.g., about 700° to about 1650° F) and the resulting oxide is generally moderately active (which is understood by those skilled in the art, is a measure of the degree of acid-reactivity of the oxide) and highly available (i.e., above about 90% by weight or more of the magnesium oxide is soluble in dilute, e.g., about 4 weight percent, hydrochloric acid). This low decomposition temperature-produced magnesium oxide is known generally as "light-burned" magnesia.

To the contrary, oxide prepared from higher temperature decomposition of the carbonate (e.g., about 2500° to about 3600° F) or light-burned magnesia which is further calcined at such relatively high temperatures has essentially no activity and is generally unavailable (i.e., the weight percent of magnesium oxide being soluble in dilute hydrochloric acid is well below the 90% by weight level). This relatively dense, hard highly refractory product is generally known as "dead-burned" magnesia and is generally inactive and unavailable even when ground into fine particles and independent of its activity and availability prior to calcining. Thus, even the low decomposition temperature-produced magnesium oxide (light-burned magnesia) which is relatively highly available may be made unavailable by further high temperature calcination to the dead-burned form.

It will be understood by those skilled in the art that magnesia having moderate activity is useful in a variety of circumstances where magnesia having essentially no activity (e.g., dead-burned magnesia) is not usable.

A substantial area of such use for light-burned (moderately active) magnesia is in conjunction with a variety of pollution control processes. Moderately active magnesia may be incorporated as a fuel additive in oil-fired utility power station furnaces to reduce the buildup of acid smut, thus increasing the desirability of employing oil as the fuel source for the production of electrical power and is also useful in stack-gas scrubbing processes where coal is chosen as the fuel for the production of electrical power. Another growing source for the use of light-burned magnesia is water treatment processes, where the magnesia is used to neutralize undersirable acids.

Light-burned magnesia is also useful in the agricultural area, and is incorporated in both fertilizer and animal feeds.

Magnesium is recognized as a necessary adjunct to the diet of animals, poultry, swine and the like. For example, adult cattle and sheep feeding on rapidly growing young grass in the spring or calves feeding entirely on milk (milk being low in magnesium) are susceptible to being affected with grass tetany, a disease characterized by hypomagnesemia. Tetany causes nervousness and an awkward gait followed by muscle tremors, rapid breathing and collapse of the animal. Similar symptoms have been noted in horses and poultry.

While treatment is frequently successful, prevention of such a condition would be preferable. Prevention is generally accomplished by adding magnesium to the diet. Although the magnesium supplement may be added in the form of various salts (e.g., magnesium citrate, acetate, nitrate, lactate, chloride, trisilicate or sulfate), it is generally added as magnesium oxide (magnesia). See, e.g., The Merck Veterinary Manual, Merck and Co., Inc., 1967, pages 556–558.

Magnesium oxide is commercially available, for example, as a food supplement for beef and dairy cattle, horses, sheep, swine and poultry and for use in dog and cat food in the form of particles (the majority of the particles having a size generally in the range of −20 +200 mesh) containing about 90% by weight or more light-burned, highly soluble magnesium oxide (and concomitantly 50% by weight or more magnesium). The insoluble portion of the magnesium oxide essentially passes through the animal or poultry and remains inactive.

Light-burned magnesia is particularly useful in pulp and paper processing. It is employed as a decolorizing agent whereby the particular color of the final paper product may be controlled. Light-burned magnesia is also useful as a constituent in various formulations for paper fillers and coatings.

Other applications for light-burned magnesia include use in sugar processing, production of oxychloride and oxysulfate cements, rayon and rubber production, production of electrical heating rods and as an asbestos substitute in fireproofing. Further, the light-burned magnesia may be employed as a boiler cleaning agent and may be substituted for conventional neutralizers such as caustic soda, soda ash and sodium bicarbonate. In substantially all of the known uses for light-burned magnesium oxide, the magnesium oxide must have a color which is white or nearly white (e.g., buff-colored) and low carbon content. Dark-colored magnesium oxide (as from impurities or additives) or magnesium oxide containing appreciable amounts of carbon are generally not commercially acceptable for such uses.

OBJECT AND SUMMARY OF THE INVENTION

It is an object of this invention to substantially alleviate or reduce the above problems of the prior art.

It is another object of this invention to conserve the available sources for the production of light-burned magnesium oxide.

It is another object of this invention to provide an improved process for treating spent, dark-colored basic oxygen furnace (BOF) firebrick to convert the dead-burned magnesium oxide therein of essentially no activity and relatively low availability to magnesium oxide of moderate activity, relatively high availability, light color and low carbon content and thus render it useful for a variety of applications for which it was not useful prior to such treatment and the resulting product.

It is a specific object of this invention to provide a low cost source of active and available magnesium oxide which may be used in the same manner as light-burned magnesim oxide.

In one aspect, the present invention provides a method of treating spent, carbon-containing basic oxygen firebrick particles at a temperature of from about 1000° to about 2000° F for a time of from about 15 to about 60 minutes, whereby the resulting calcined particles have a greater activity and higher solubility in dilute hydrochloric acid than before calcining, with substantially all of the carbon in the said particles being removed, and the resulting product.

The present invention further provides, in still another aspect a method for treating particles containing dead-burned magnesium oxide having essentially no activity which comprises: calcining said particles at a temperature of from about 1000° to about 2000° F for a time of from about 15 to about 60 minutes, the resulting magnesium oxide having an activity which is greater than that of the uncalcined material, and the resulting product.

DETAILED DESCRIPTION OF THE INVENTION

It has been unexpectedly found that various sources of dead-burned magnesium oxide including spent BOF firebrick, BOF firebrick in an unused condition (which is predominantly magnesium oxide bonded with tar), along with green grain dead-burned magnesite (the dead-burned magnesium oxide material from which tar-bonded BOF brick is made) may be calcined at a temperature of from about 1000° to about 2000° F. for a time of from about 15 to about 60 minutes to form magnesium oxide of moderate activity (like light-burned magnesium) and high availability, i.e., above about 90% solubility in dilute hydrochloric acid. Also, the dark coloration due to the presence of carbon in spent BOF firebrick is substantially eliminated during calcination resulting in a light, buff-colored product having essentially no carbon content. Notwithstanding the high temperatures to which green grain magnesite and firebrick are subjected in their production, and further, notwithstanding the high temperatures which spent BOF firebrick are subjected to in use in a basic oxygen furnace (all of which temperatures would be expected to render the magnesium oxide component inactive and insoluble), above about 90% of the magnesium oxide treated by the process of this invention is soluble in dilute hydrochloric acid.

While the present invention is applicable to unused BOF firebrick or green grain magnesite, it is particularly advantageous with respect to spent BOF firebrick. Presently, few uses are known for spent BOF firebrick. The spent firebrick is removed from a basic oxygen furnace along with slag and garbage left in the furnace as waste or scrap, and is usually used as road fill or land fill. Often, the spent firebrick is dumped directly into lakes or rivers, generally becoming an unnecessary burden upon the ecology. Being an environmental nuisance, the spent firebrick is readily available for any new uses and is a very inexpensive source of light-burned magnesium oxide when processed according to the procedures described herein, which procedures are novel and part of the invention.

As is known in the art, tar bonded or tar impregnated firebrick utilized in basic oxygen furnaces generally have a high magnesium oxide content, for example, about 90 or more weight percent magnesium oxide with the remainder of the firebrick being calcium oxide, silica, alumina, iron oxide and combustibles. Spent BOF firebrick also contains carbon, generally in an amont of about 2 weight percent and is relatively dark-colored.

Any spent basic oxygen furnace firebrick comprising a major (e.g., above about 50 weight percent) portion of magnesium oxide may be utilized in the present invention, although it is preferred that the firebrick contain about 85 weight percent magnesium oxide. By "spent basic oxygen furnace firebrick" is meant firebrick which has been subjected to conventional heating schedules in use for the production of steel by the basic oxygen process. Generally, the spent firebrick will have been used for from about 500 or more, typically from about 600 to 1000, heats. As known in the art, each heat is conducted generally at a temperature of about 2800° to 3100° F., typically for a time of from about 2 to 8 hours.

It has unexpectedly been found that spent firebrick (which is predominantly magnesium oxide bonded with tar) from a basic oxygen furnace may possess a relatively high availability of about 75 percent (or higher) of the magnesium oxide present. While this material may be useful in some applications, it contains appreciable amounts of carbon (e.g., about 2 percent of weight) and is relatively dark-colored. Treatment of this material according to the present invention not only increases the availability of the magnesium oxide (generally by at least about 20 to 30 percent), it also reduces the carbon content to an essentially zero amount, and removes the dark discolorations. The resulting product has a wider range of applications as well as being more suited for the same applications as untreated spent firebrick.

Spent basic oxygen furnace firebrick is generally available in the form of large chunks or blocks of the brick together with discrete pieces of slag or iron from the basic oxygen furnace. Loose slag may be removed by hand or by magnet. The firebrick may thereafter be crushed and screened such that essentially all of the particles are less than ¾ inch, with generally at least 75, preferably at least 95, percent of the particles are of a size in the range of ¼ to ½ inch (United States Standard Sieve). It would be understood that the particle size may vary depending on the ultimate use of the calcined magnesium oxide. Also, it has been found that particles longer than ¾ inch may not be completely reacted in the process of the present invention within the time indicated and be dark and inactive at the centers.

The spent firebrick particles are subject to calcination at a temperature and time sufficient to convert the dead-burned magnesia to a magnesia of moderate activity, high availability, light color and low carbon content, which temperature is in the range of from about 1000° to about 2000°, preferably from about 1400° to about 1800°, F. and time is in the range of from about 15 to about 60, preferably from about 20 to about 40 minutes. Surprisingly, the dead-burned magnesium oxide in the spent firebrick is converted by this calcination to a magnesium oxide having characteristics of light-burned magnesia, e.g., moderate activity and high availability. Further, the calcination of the spent firebrick particles substantially decreases the carbon content therein to essentially zero and substantially removes the dark color of the particles to result in particles having a light (i.e., buff-colored or lighter) color. The calcined magnesium oxide product may now be utilized, e.g., as soda, soda ash, and sodium bicarbonate, as a boiler cleaner, and as an additive in paper and pulp making processes, all of which uses require moderately active, low carbon-content, relatively light-colored sources of magnesium oxide. If desired, the calcined particles may be crushed again and rescreened to form a product of a particular size.

Spent firebrick particles of the general size of about $-20 +200$ mesh have a bulk density (loose) of about 85 pounds per cubic foot. This bulk density is about 50% greater than other conventional light-burned magnesium oxide and makes the spent firebrick much easier to handle. The calcined spent firebrick also shows a surprising resistance to hydration as compared to conventional light-burned magnesium oxide. Because of the lessened tendency to hydration, the spent firebrick does not cake when bagged and is less irritating to the skin and linings of the nose and throat.

Generally, the calcined spent firebrick can be utilized as a substitute for conventional sources of light-burned magnesium oxide in the same manner and amount in which those conventional sources are employed. For example, the calcined, spent firebrick particles may be added to waste water to neutralize the acid therein prior to discharge of the waste water to the environment or may be incorporated as a fuel additive in oil-fired utility power station furnaces to reduce the buildup of acid smut in the furnace effluent.

In the production of rubber, the calcined spent firebrick particles may be compounded prior to vulcanization to serve as an accelerator for the rubber vulcanization process. The calcined, spent firebrick also serves as a neutralizing agent in the rubber making process.

The calcined spent firebrick particles may be combined with other feed and/or other dietary supplements for animals, ruminants or poultry in any convenient manner. For example, the calcined spent firebrick particles may be incorporated as a dietary supplement by mixing with any particulate feed mixturee, by incorporation into molasses blocks, or by mixing with liquid feeds or feed coatings. The calcined, spent firebrick particles can be added to rations for animals or poultry in amounts sufficient to inhibit magnesium deficiency which amount may be readily determined by the skilled artisan in any particular situation.

The calcined spent firebrick can be utilized as a substitute for conventional sources in the processing of pulp and paper. The calcined, spent firebrick particles are employed as a constituent in paper fillers and paper coatings, and as a decolorizing agent for paper pulp.

The invention is additionally illustrated in connection with the following Examples which are considered to be illustrative of the present invention. It should be understood, however, that the invention is not limited to the specific details of the Examples.

EXAMPLE I

Spent basic oxygen furnace firebrick containing on an average of about 90% by weight magnesium oxide, balance primarily calcium oxide, alumina, silica and iron oxide, after approximately 1000 heats in a basic oxygen furnace, is crushed such that essentially all (i.e., about 95% or more) of the particles are minus ½ inch (U.S. Standard Sieve). The resulting particles have essentially no activity, an average dilute hydrochloric acid solubility of about 75%, contain about 2 weight percent carbon and are relatively dark-colored.

The crushed, spent basic oxygen furnace firebrick is calcined at a temperature of about 1500° F for approximately 30 minutes in a commercially available rotating cylinder having a gas flame at one end impinging on a countercurrent flow of the spent firebrick particles. The magnesium oxide in the calcined, spent firebrick product is moderately active (of about the same degree as conventional light-burned magnesium oxide), has a dilute hydrochloric acid solubility of about 97%. The particles are buff-colored and essentially carbon-free.

EXAMPLE II

Green grain dead-burned magnesite is crushed such that essentially all (i.e., about 95% or more) of the particles have a size of ½ inch or less. The particles have a dilute hydrochloric acid solubility of about 61%. After calcination at a temperature of about 1500° F for a period of about 30 minutes, a light-burned magnesia is produced which has a dilute hydrochloric acid solubility of about 91%. The activity of the calcined particles is significantly greater than that of the particles before calcining.

EXAMPLE III

Dead-burned, tar bonded basic oxygen furnace firebrick is crushed to a particle size of less than ½ inch. The crushed firebrick contains about 2 weight percent carbon, has no activity and a dilute hydrochloric acid solubility of about 75%. After calcination at a temperature of about 1400° F for a period of about 1 hour, the magnesia in the firebrick is converted to a moderately active magnesia with a dilute hydrochloric acid solubility of about 94% and essentially no carbon content.

EXAMPLE IV

The calcined, spent firebrick particles of Example I are substituted for conventional sources of light-burned magnesium oxide as a constituent in paper fillers, paper coatings, and decolorizing agent for paper pulp in a paper manufacturing process. The results obtained are comparable with those obtained with conventional light-burned magnesium oxide.

EXAMPLE V

The calcined, spent firebrick particles of Examples I and II are incorporated into daily grain rations for cattle and chickens and into a mineral mix for swine in the same manner and as a replacement for conventional feed grade magnesium oxide dietary supplement. There are no observable signs of grass tetany or other condition indicating hypomagnesemia in any of the cattle or swine, and the incidence of hypomagnesemia in chickens is observed to be equal to or less than that observed with conventional magnesium oxide feed supplements.

The nature, scope, utility and effectiveness of the present invention have been described and specifically exemplified in the foregoing specification. However, it should be understood that these examples are not intended to be limiting and that the true scope of the invention to be protected is particularly pointed out in the appended claims.

What is claimed is:

1. A method of treating spent, carbon-containing basic oxygen firebrick particles which comprises:
    calcining the said spent firebrick particles at a temperature of from about 1000° to about 2000° F for a time of from about 15 to about 60 minutes whereby the resulting calcined particles have greater activity and a higher solubility in dilute hydrochloric acid than before calcining, with substantially all of the carbon in the said particles being removed.

2. The method of claim 1 whereby at last 75% of the said particles have a particle size of about ½ inch or less.

3. The method of claim 1 whereby the said spent firebrick particles are calcined at a temperature of from about 1400° to about 1800° F for a time of from about 20 to about 40 minutes.

4. The method of claim 1 wherein said spent firebrick contains at least about 90 weight percent magnesium oxide.

5. The method of claim 4 wherein said calcined particles have a solubility in dilute hydrochloric acid of at least 90%.

6. A method for treating particles containing dead-burned magnesium oxide having essentially no activity which comprises:
   calcining the said particles at a temperature of from about 1000° to about 2000° F for a time of from about 15 to about 60 minutes, the resulting magnesium oxide having an activity which is greater than that of the uncalcined material.

7. The method of claim 6 wherein said particles prior to calcining have a particle size less than about ¾ inch.

8. The method of claim 7 wherein said particles are calcined at a temperature of from about 1400° to about 1800° F. for a time of from about 20 to about 40 minutes.

* * * * *